Patented Apr. 8, 1941

2,237,372

UNITED STATES PATENT OFFICE 2,237,372

PREPARATION OF SULPHANILAMIDE

John Kenson Simons, Dormont, Pa., assignor to Plaskon Company, Inc., Toledo, Ohio, a corporation of Delaware No Drawing. Application June 16, 1938,
Serial No. 214,143

3 Claims. (Cl. 260—556)

In the synthesis of sulphanilamide, which is p-aniline sulphonamide ($NH_2C_6H_4SO_2NH_2$), some difficulty arises from the necessity of introducing two amino groups into the molecule. If chlorobenzene ($ClC_6H_5$) is used as the starting material, p-chlorobenzene-sulphonic acid ($ClC_6H_4SO_2OH$) can be prepared without great difficulty. Then if ammonolysis of the p-chlorobenzene-sulphonic acid is carried out, the product is sulphanilic acid ($NH_2C_6H_4SO_2OH$). Apparently the sulphanilic acid in produced in the form of an inner salt of the sulphonic group with the amino group so that further ammonolysis of the sulphanilic acid to sulphanilamide is prevented.

The chlorobenzene might be converted to p-chlorobenzene sulphonyl chloride ($ClC_6H_4SO_2Cl$) before ammonolysis is attempted. However, the only product obtained heretofore by ammonolysis of p-chlorobenzene sulphonyl chloride has been p-chlorobenzene sulphonamide

($ClC_6H_4SO_2NH_2$)

not sulphanilamide.

In order to obtain the nuclear amino group in the synthesis of sulphanilamide it has been necessary heretofore to start with aniline ($NH_2C_6H_5$), which is more expensive than chlorobenzene. Then, to protect the nuclear amino group during the sulphonation of the aniline, it has been necessary to convert the aniline first to acetanilide ($CH_3CONHC_6H_5$). Conversion of acetanilide to the sulphonyl chloride followed by ammonolysis produces acetyl sulphanilamide

($CH_3CONHC_6H_4SO_2NH_2$)

which must be converted to sulphanilamide in an additional step.

The principal object of the invention is to provide a method of preparing sulphanilamide which has only half as many steps and utilizes a cheaper starting material than the method heretofore employed. More specific objects and advantages are apparent from the description, which merely discloses and illustrates the invention and is not intended to impose limitations upon the claims.

It is believed that the use of chlorobenzene as the starting material in the preparation of sulphanilamide has not heretofore been suggested, possibly because of the fact that the ammonolysis of p-chlorobenzene sulphonyl chloride has never been known to yield any product but p-chlorobenzene sulphonamide. The present invention is based upon the discovery that sulphanilamide can be prepared from p-chlorobenzene sulphonamide by reacting it with ammonia. In the present method of preparing sulphanilamide, chlorobenzene may be used as the starting material, and it may be converted into p-chlorobenzene sulphonyl chloride in a single step. The ammonolysis of p-chlorobenzene sulphonyl chloride to sulphanilamide may then be performed in one additional step. In accordance with the invention, therefore, sulphanilamide may be prepared from chlorobenzene in two steps. Heretofore sulphanilamide has been prepared in four steps from aniline, which is more expensive than chlorobenzene.

When p-chlorobenzene sulphonyl chloride is converted to sulphanilamide in a single step, p-chlorobenzene sulphonamide is formed at the outset and is then converted to sulphanilamide. The specific conditions under which p-chlorobenzene sulphonamide is most readily converted to sulphanilamide are rather peculiar. The preferred method of conversion is vigorous ammonolysis. Thus the p-chlorobenzene sulphonamide may be reacted with ammonia at about 150° C. or above in the presence of a suitable copper catalyst. The ammonia may be in the form of a concentrated aqueous solution, and an autoclave may be used to confine the reacting ingredients. If the step in which sulphanilamide is produced is to start with p-chlorobenzene sulphonamide, that compound may be prepared by reacting p-chlorobenzene sulphonyl chloride with ammonia in the form of an aqueous solution, or solid ammonium carbonate.

If desired, the conversion from p-chlorobenzene sulphonyl chloride to sulphanilamide may be carried on in a single step by bringing together p-chlorobenzene sulphonyl chloride, ammonia and a suitable copper catalyst, and then heating to the desired temperature. The p-chlorobenzene sulphonyl chloride is preferably produced by treating chlorobenzene with chlorosulphonic acid, but it may also be produced by sulphonating chlorobenzene and converting the sulphonic acid to the sulphonyl chloride by means of phosphorous pentachloride.

The conversion of p-chlorobenzene sulphonamide to sulphanilamide may be carried out in the presence of one part of cuprous oxide for every ten parts of p-chlorobenzene sulphonamide. When the sulphonyl chloride is used instead of the sulphonamide, the cuprous oxide catalyst may be replaced by an equal quantity of copper bronze. Since the sulphonyl chloride is converted to the sulphonamide at the beginning of the step, with the production of ammonium chloride as a byproduct, the only change made by substituting the sulphonyl chloride for the sulphonamide is to introduce ammonium chloride. Thus a procedure that gives satisfactory results with the sulphonyl chloride will give the same results with the sulphonamide if the proper amount of ammonium chloride is added along with the sulphonamide. The ammonia is preferably added in the form of three to seven parts of concentrated aqueous ammonia for each part of the sulphonyl chloride or sulphonamide.

The copper catalysts that cause the nuclear halogen group to be replaced by an amino group are believed to introduce monovalent copper into the aqueous solution. The monovalent copper is probably in the form of ammoniated cuprous ion. Powdered copper, copper bronze and cuprous oxide when used as catalysts are thought to enter the solution as monovalent copper.

A portion of the sulphanilamide that is produced may be separated by crystallizing it directly from the liquid that is present at the end of the reaction. The remaining solution may then be treated with hydrogen sulphide to remove copper salts, and then boiled to remove excess ammonia and hydrogen sulphide. The last of the sulphanilamide may be obtained by crystallization from the concentrated solution.

Complete replacement of the nuclear halogen by the amino group can be secured by the present method. Some p-p'-disulphamido diphenylamine may be present in the sulphanilamide as an impurity; it may be removed if desired.

*Example 1*

Chlorobenzene is added slowly to 3 to 4 times its weight of chlorosulphonic acid; the liquid is stirred and its temperature is kept at 25° to 35° C. by external cooling. When the resulting solution is poured onto ice, p-chlorobenzene sulphonyl chloride precipitates as a granular solid which is filtered and washed with cold water to produce 50 to 80 per cent of the theoretical yield. Further purification of the p-chlorobenzene sulphonyl chloride is not necessary. The p-chlorobenzene sulphonyl chloride may be vacuum distilled, however, but the purification by vacuum distillation is not successful unless a benzene solution of the sulphonyl chloride is first washed with dilute cold alkali and then washed with water and dried. A quantitative conversion of the p-chlorobenzene sulphonyl chloride to the sulphonamide is produced by the action of concentrated aqueous ammonia or solid ammonium carbonate. The sulphonamide may be purified by washing with cold water or by crystallizing from hot water. 9.5 grams of the p-chlorobenzene sulphonamide so produced are heated with 30 c. c. of concentrated aqueous ammonia (specific gravity 0.90), and 1 gram of cuprous oxide in an autoclave for 12 hours at 160° C. A pressure of about 500 pounds per square inch develops at this temperature. A nearly quantitative yield is produced by filtering out the crystalline sulphanilamide after cooling the resultant liquid and then treating the filtrate with hydrogen sulphide to remove copper salts, evaporating, and crystallizing the remaining sulphanilamide. The crystals which are filtered directly from the solution that is taken from the autoclave are quite pure and represent a 29 per cent yield. The remaining crystals that are obtained may be recrystallized from water if desired.

*Example 2*

9.5 grams of p-chlorobenzene sulphonamide are heated with 30 c. c. of concentrated aqueous ammonia, 2.5 grams of ammonium chloride, and 1 gram of copper bronze for 12 hours in an autoclave at 160° C. and at the pressure which develops. About a 50 per cent (4 grams) yield of sulphanilamide is then obtained by proceeding as in Example 1.

*Example 3*

21 grams of p-chlorobenzene sulphonyl chloride, 150 c. c. of concentrated aqueous ammonia, and 2 grams of copper bronze or copper powder are brought together and cooled during the initial reaction in which the sulphonamide is formed. The resulting mixture is then heated for 12 hours in an autoclave at 150° to 160° C. and at the pressure which develops. The conversion of the p-chlorobenzene sulphonamide is complete, and the separation of the sulphanilamide may be carried out as in Example 1.

Various methods embodying the invention may be devised to meet various requirements.

Having described my invention, I claim:

1. A method of preparing sulphanilamide that comprises bringing together p-chlorobenzene sulphonyl chloride, aqueous ammonia and a copper catalyst, and heating to about 150° C.

2. A method of preparing sulphanilamide that comprises heating p-chlorobenzene sulphonamide, aqueous ammonia and a copper catalyst to about 150° C. in an autoclave.

3. A method of preparing sulphanilamide that comprises heating p-chlorobenzene sulphonamide, aqueous ammonia and a copper catalyst to about 150° C.

JOHN KENSON SIMONS.